(12) United States Patent
Havener

(10) Patent No.: US 6,375,201 B2
(45) Date of Patent: *Apr. 23, 2002

(54) WALK BEHIND MOWER SULKY APPARATUS WITH IMPROVED OPERATOR PLATFORM ATTACHMENT MEANS

(75) Inventor: Chris Havener, Bradley, IL (US)

(73) Assignee: Havener Enterprises, Inc., Bradley, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,619

(22) Filed: Dec. 21, 1999

(51) Int. Cl.[7] .............................................. B62D 63/00
(52) U.S. Cl. ...................... 280/32.7; 280/494; 280/493
(58) Field of Search ................................ 280/32.7, 494, 280/493, 492, 38; 180/15, 16; 56/DIG. 9, 14.7

(56) References Cited

U.S. PATENT DOCUMENTS

| | | | |
|---|---|---|---|
| 1,187,907 A | * 6/1916 | Hanson | 280/32.7 |
| 1,188,298 A | * 6/1916 | Michaeli | 280/32.7 |
| 2,218,064 A | 10/1940 | Amsbury | |
| 4,711,461 A | * 12/1987 | Fromberg | 280/494 |
| 5,004,251 A | 4/1991 | Velke et al. | |
| 5,118,123 A | 6/1992 | Betrock | |
| 5,186,483 A | * 2/1993 | Sheppard | 280/494 |
| 5,388,850 A | 2/1995 | Simone | |
| 5,413,364 A | * 5/1995 | Hafendorfer | 280/32.7 |
| 5,810,371 A | 9/1998 | Velke | |
| 5,882,020 A | 3/1999 | Velke | |
| 5,947,505 A | * 9/1999 | Martin | 280/49 |
| D417,676 S | * 12/1999 | Havener | D15/17 |
| 6,042,137 A | * 3/2000 | McIntosh | 280/490.1 |
| 6,062,582 A | * 5/2000 | Martin | 280/493 |

* cited by examiner

Primary Examiner—J. J. Swann
Assistant Examiner—James S. McClellan
(74) Attorney, Agent, or Firm—Knechtel, Demeur & Samlan

(57) ABSTRACT

Provided is a sulky in which an operator platform is attached to a hitch arm through the interconnection of a vertical pivot tube and an essentially C-shaped clevis. The vertical pivot tube is secured to the clevis by a vertical pivot pin and hinge. The clevis counter balances and leverages the forces and loads that are applied to the vertical pivot pin while the sulky is in operation and, thereby, prevents the unnecessary anomalies and structural failures of the vertical pivot pin. Alternate embodiments detailing alternate clevis configurations are also presented.

14 Claims, 3 Drawing Sheets

WALK BEHIND MOWER SULKY APPARATUS WITH IMPROVED OPERATOR PLATFORM ATTACHMENT MEANS

I. FIELD OF THE INVENTION

The present invention relates to sulkies for self-propelled walk behind mowers and, more particularly, to a sulky that provides a clevis on the operator platform for attachment to a vertical pivot point on the hitch arm. The improvement improves control of the distributive forces and loads of the sulky and, thereby, prevents unnecessary structural failures in the vertical pivot point.

II. DESCRIPTION OF THE PRIOR ART

Sulky devices have been used in conjunction with power mowers for many years and are, thus, well known in the prior art. Sulkies were originally used with mowers in a general trailer type fashion without the use of pivots. For example, U.S. Pat. No. 2,218,064 to G. A. Amsbury entitled "Riding Trailer" discloses a riding trailer which can be hitched to the rear of a lawn mower by two side bars. The riding trailer has a seat situated above a supporting wheel and the user is provided with foot controls to guide the movements of the lawn mower. A shortcoming of this invention is that the side bars prohibit rotation of the trailer with respect to the lawn mower and, thereby, do not permit use of the lawn mower to manipulate through narrow turns in a specific area.

Later, sulkies were designed to incorporate the use of a vertical pivot point at the attachment of the sulky to the mower. For example, U.S. Pat. No. 5,118,123 to Betrock entitled "Standing/Sitting Lawn Mower Trailer" discloses a system in which a trailer hitches to a self-propelled lawn mower. The trailer has an elongated towbar which is adjusted and locked to the lawn mower. Similarly, U.S. Pat. No. 5,388,850 to Simone entitled "Convertible Sulky" discloses an H-shaped support wheelbase frame member with a T-shaped mower attachment frame. The H-shaped support wheelbase is attached to the mower through a ball-hitch fixture on the frame. A shortcoming of these devices is that by placing the vertical pivot point so close to the mower, the turning radius of the sulky with respect to the mower is limited since the sulky swings out from behind the mower during a turn, often at a distance greater than an operator is able to control. Thus, devices having an elongated towbar or frame that pivot at the mower/sulky junction only do not permit rotation of the trailer or sulky with respect to the lawn mower and, therefore, neither the trailer nor the sulky permit the user to maneuver through a narrow or small turning radius.

A vertical pivot point located at the attachment of the sulky to the lawn mower provides a sulky that is more stable for the operator, but less maneuverable, as exhibited by the patents in the preceding paragraph. Conversely, the reverse is true. A vertical pivot point located along the hitch arm of the sulky and not directly with the lawn mower provides a sulky that is less stable, but more maneuverable.

To accommodate increased maneuverability, sulkies have been designed with vertical pivot points along the attachment arms to enable the lawn mower to maneuver through a narrow or small turning radius or as desired by the user. For example, U.S. Pat. No. 5,004,251 to Velke et al. entitled "Sulky Apparatus Attachable To A Self-Propelled Power Mower" discloses a sulky apparatus that is attachable to a self-propelled power mower to transport an operator in the standing position. The sulky provides a first arm connected to the lawn mower through a horizontal pivot point and a second arm connected to the operator platform. The first arm and the second arm are connected through a vertical pivot point permits movement of the operator platform about the vertical pivot point. In this fashion, the lawn mower can better navigate tight turns.

Likewise, U.S. Pat. Nos. 5,810,371 and 5,882,020 to Velke entitled "Sulky Device With Triple Pivot Attachment To Mower" disclose the sulky in U.S. Pat. No. 5,004,251 with a third pivot point located at the connection of the second arm to the operator platform and an additional wheel to form a two-wheeled sulky. The third pivot point operates along the horizontal axis and theoretically provides a storage position for the operator platform with respect to the lawn mower.

Although these sulkies permit operation in small areas, they do not, particularly in single wheel sulkies, leverage the forces and loads on the vertical pivot point as applied by the weight of the operator and torque of the mower. Therefore, the vertical pivot point is susceptible to uncontrollable bending or structural failure of the vertical pivot point. Also, the uncontrollable bending or structural failure requires that the weight of the operator must be limited to reduce the counterbalancing forces on the vertical pivot point. Therefore, these sulkies are not practical for all consumers.

Another shortcoming of these sulkies is that the vertical pivot point permits 360° rotation about the first arm. The inherent danger with the free rotation is that a user is vulnerable to injury if positioned on the operator platform as the second arm rotates the operator platform to cross under the first arm.

In the prior art designs, placing the vertical pivot point away from the lawn mower and closer to the operator platform leads to unnecessary torquing which, in turn, causes premature sulky failure. Further, the design of these sulkies is suited best in a two wheel design as the torque forces are exacerbated in a single wheel sulky since the operator must balance himself. In spite of this problem, many operators prefer single wheeled sulkies over two wheeled sulkies because they maneuver better.

Thus, there is a need and there has never been disclosed a sulky that provides counter balance and reduction of the forces and loads as applied to the vertical pivot point to prevent the unnecessary structural anomalies and failures in the vertical pivot point.

III. OBJECTS OF THE INVENTION

It is the primary object of the present invention to prevent unnecessary structural anomalies and failures in the vertical pivot point of sulkies. A related object of the present invention is to reduce the forces and loads applied to the vertical pivot point that result from the weight of the operator and the torque supplied by the operation of the lawn mower. This is provided for in an operator platform with a clevis to affix to a vertical pivot point on a hitch arm. The clevis is adapted to receive the vertical pivot point on the hitch arm and to coact with the vertical pivot point to secure a hinge and, thereby, attach the operator platform to the hitch arm.

Another related object of the present invention is to provide a means to counter balance the forces and loads applied to the vertical pivot point.

Still another object of the invention is to permit the use of the sulky device by heavier operators.

Still another object of the invention is to prohibit unlimited rotation of the operator platform about the vertical pivot point to provide increased safety to the operator.

Still another object of the invention is to provide an increased useful life for the vertical pivot point. A related object of the invention is to reduce the costs associated with repairing a damaged vertical pivot point. A further related object of the invention is to provide the user with a more reliable sulky.

Other objects of the present invention will become more apparent to persons having ordinary skill in the art to which the present invention pertains from the following description taken in conjunction with the accompanying drawings.

IV. SUMMARY OF THE INVENTION

The objects of the present invention are provided for in a sulky having an improved attachment interrelationship between an operator platform and a hitch arm that connects the sulky to a self-propelled walk behind lawn mower. The operator platform is attached to the hitch arm through a vertical pivot point and a generally C-shaped clevis.

The hitch arm is connected at one end to the rear of a mower. The opposite end of the hitch arm is fitted with a vertical pivot point. The vertical pivot point comprises a vertical pivot tube and a corresponding vertical pivot pin. Preferably, the clevis has a top support member, a bottom support member, and an operator platform support member. The top and bottom support members extend essentially horizontally from the front of the operator platform and essentially parallel to one another at a predetermined vertical distance from one another. The vertical pivot point is inserted into the opening of the space created by the vertical distance between the top and bottom support members, the vertical pivot point then being secured to the clevis by a vertical pivot pin that is inserted into holes found in the top support member, vertical pivot tube, and bottom support member.

V. BRIEF DESCRIPTION OF THE DRAWINGS

The Description of the Preferred Embodiment will be better understood with reference to the following figures.

VI. DETAILED DESCRIPTION OF THE PREFERRED EMBODIMENT

Figure 1:
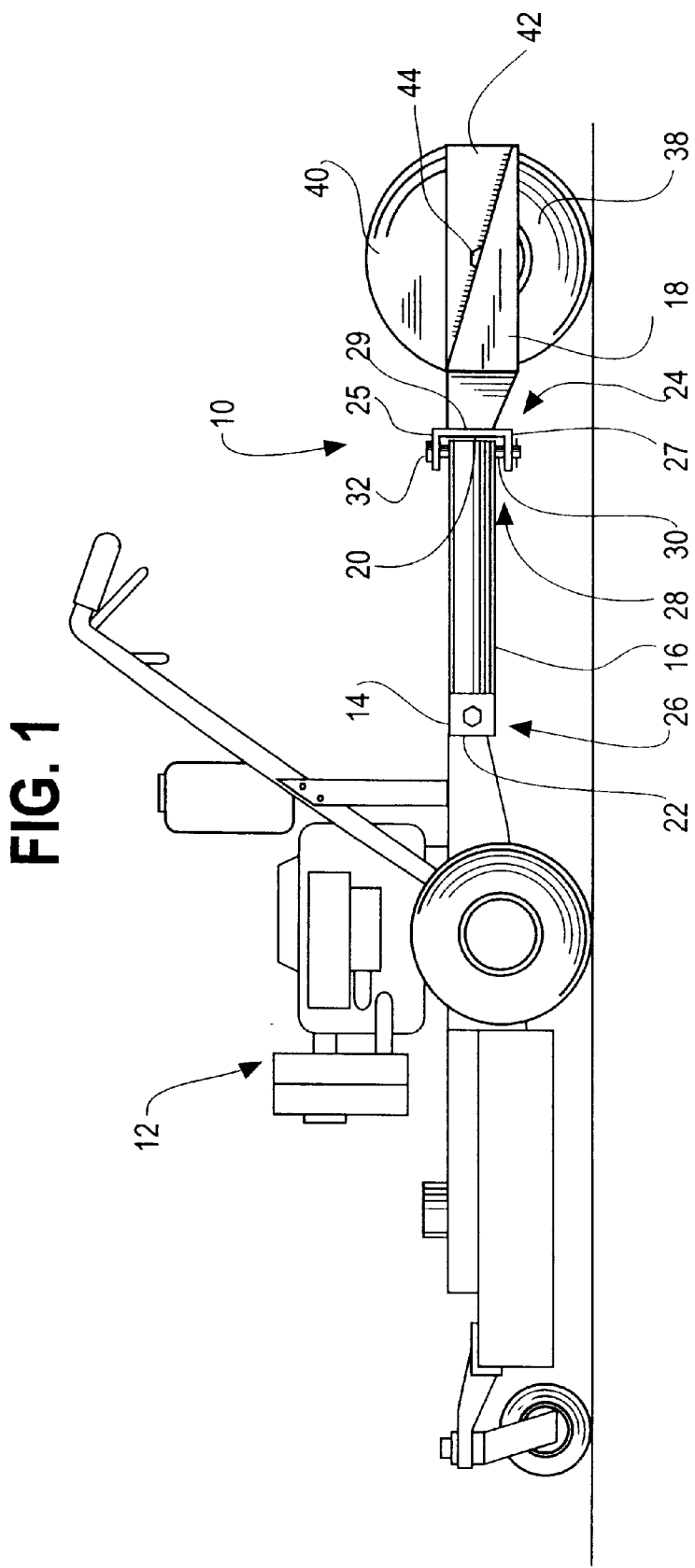
FIG. 1 is a side elevational view of the sulky device attached to the rear of a self-propelled walk behind lawn mower.

Turning first to FIG. 1, there is illustrated a sulky 10 attached to a self-propelled walk behind lawn mower 12. Lawn mower 12 may be any type of mower with which a sulky 10 may be used. Sulky 10 includes a hitch arm 16 which has a distal end 20 and a proximal end 22. Hitch arm 16 is affixed to lawn mower 12 by a hitch 14 at proximal end 22. Distal end 20 includes a vertical pivot point 28 and is connected to operator platform 18 by a clevis 24.

In the preferred embodiment, clevis 24 comprises a top support member 25, a bottom support member 27, and an operator platform attachment member 29 co-formed into a generally C-shaped member. Top support member 25 and bottom support member 27 each have vertical pin insertion holes 31, 31a (FIG. 3) through their entire thickness at an essentially vertical angle. In this embodiment, operator platform attachment member 29 of clevis 24 is welded to operator platform 18. Alternatively, clevis 24 may be attached to operator platform 18 by any other means, such as bolting, that would secure clevis 24 to operator platform 18 for operable use.

Figure 5:
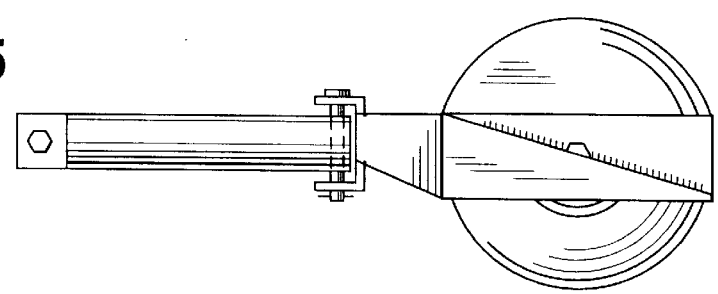
FIG. 5 is a side partial cross-sectional view of the sulky device illustrating the clevis as extending directly from the operator platform.

In an alternate embodiment, top support member 25 and bottom support member 27 may be attached directly to operator platform 18 (See FIG. 5). So long as top support member 25 and bottom support member 27 are securely bonded to operator platform 18, the configuration is not critical to the inventive device.

Figure 4:
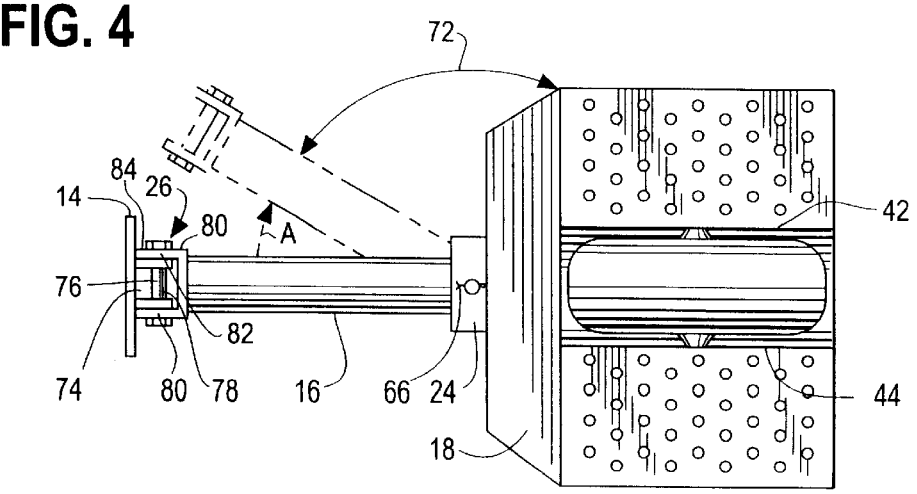
FIG. 4 is a bottom view of the sulky device illustrating the clevis member and rotation of the hitch arm with respect to the operator platform.
Figure 4A:
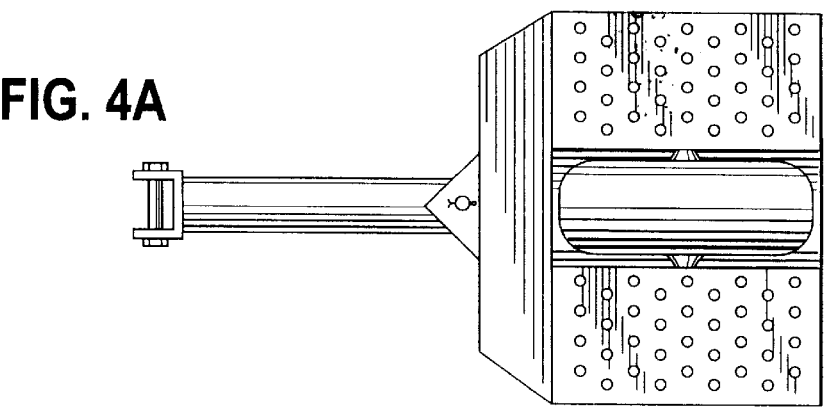
FIG. 4A is a bottom view of the sulky device illustrating the clevis member in a triangle configuration.
Figure 4B:
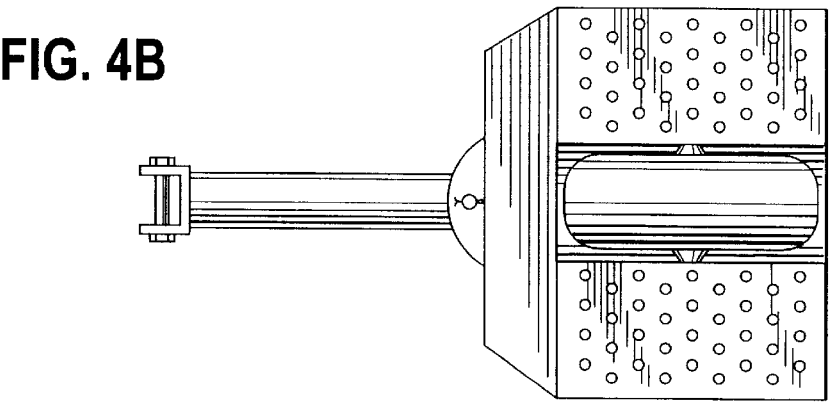
FIG. 4B is a bottom view of the sulky device illustrating the clevis member in a crescent configuration.

Also, when viewed from the top, top support member 25 and bottom support member 27 may be configured in a variety of shapes such as a square or rectangle (See FIG. 4), a triangle (See FIG. 4A), or a crescent shape (See FIG. 4B). The triangle shape may be the most economical because it is easy to produce and contains the least amount of material, yet provides a strong support.

Vertical pivot point 28 comprises a vertical pivot tube 30 and a vertical pivot pin 32 with vertical pivot tube 30 affixed to distal end 20 of hitch arm 16. In the typical sulky, vertical pivot tube 30 is welded to hitch arm 16. Vertical pivot tube 30 is rotatably mounted to clevis 24 and provides the connection of hitch arm 16 to operator platform 18. The details of the attachment of vertical pivot tube 30 to clevis 24 are discussed more fully below.

Figure 6:
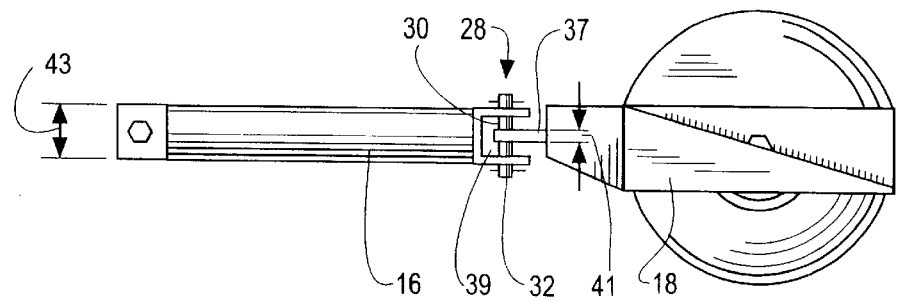
FIG. 6 is a side partial cross-sectional view of the sulky device illustrating an alternate embodiment in which the clevis is a single support member extending from the operator platform into a slot located within the vertical pivot point.

In yet another embodiment, a single support member 37 extends outwardly from the front of operator platform 18. The single support member 37 has a member width 41 which is smaller than the platform width 43 of the operator platform 18. In this embodiment, single support member 37 may rotatably attach to vertical pivot point 28 of hitch arm 16 which includes a slot 39 found along the length of vertical pivot tube 30 (See FIG. 6). In the single support member embodiment, the slotted vertical pivot tube, as depicted in FIG. 6, provides the greatest strength and least risk of malfunction since the forces and loads on the vertical pivot pin 32 are more evenly distributed along its length than in a top or bottom mount configuration of the prior art designs. Likewise, the forces and loads on the vertical pivot tube 30 are also more evenly distributed.

Operator platform 18 is generally used by an operator in the standing position. Operator platform 18 has feet platforms 34 and 36 (FIG. 2) that are separated by a wheel 38. While the preferred embodiment is directed to a single wheel sulky, the principles involved work as well with multiple wheeled sulkies. Accordingly, operator platform 18 may have two wheels 38 with the feet platforms 34 and 36 located between wheels 38. For operator safety, wheel 38 should be covered by a fender 40.

Figure 2:
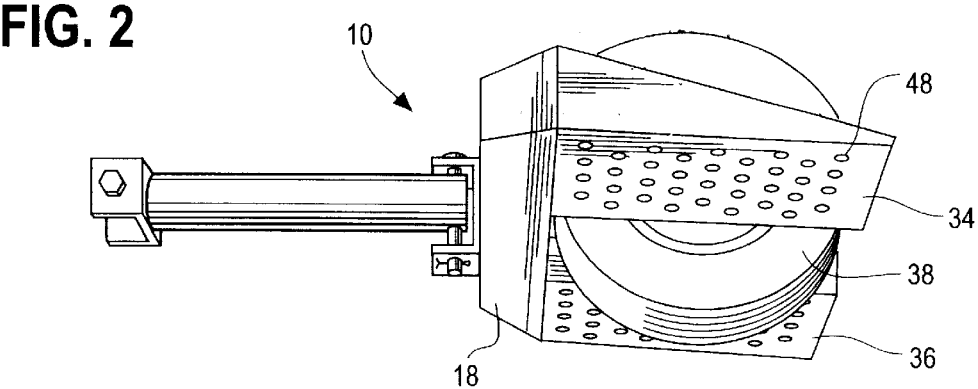
FIG. 2 is a side perspective view of the sulky device depicting the operator platform and the clevis member.

Turning to FIG. 2, sulky 10 is depicted as detached from mower 12. Operator platform 18 with feet platforms 34 and 36 and wheel 38 are illustrated. Wheel 38 is located in the center of operator platform 18 to support the weight of the operator and stabilize the balance of the operator while sulky 10 is in use.

Figure 3:
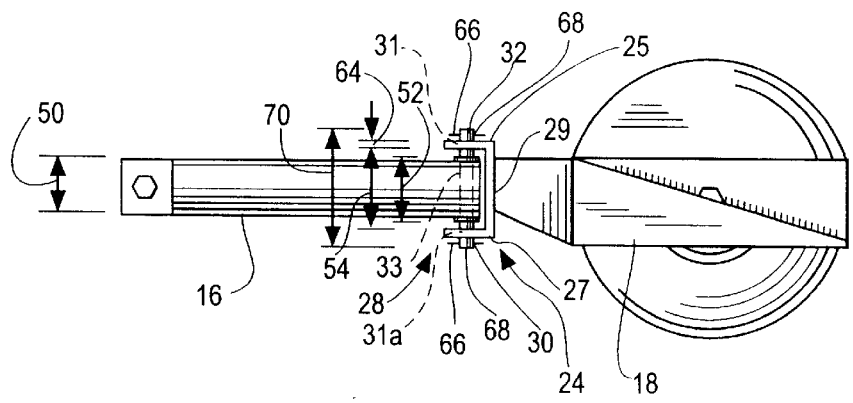
FIG. 3 is a side partial cross-sectional view of the sulky device as assembled to a hitch arm and illustrating the attachment of the clevis member.

In FIG. 3, the attachment of operator platform 18 to hitch arm 16 through the interconnection of vertical pivot point 28 and clevis 24 is illustrated. Hitch arm 16 has an arm height 50. Clevis 24 has an inner clevis height 54 which is slightly larger than tube height 52.

Vertical pivot tube 30 has a cylindrical bore 33 through its center to receive and house vertical pivot pin 32. Top support member 25 and bottom support member 27 are essentially parallel to one another and at a predetermined vertical distance such that vertical tube 30 can be placed between them and move freely.

To connect vertical pivot tube 30 to clevis 24, vertical pivot tube 30 is inserted between top support member 25 and bottom support member 27 until the cylindrical bore 33 of the vertical pivot tube 30 is aligned with hole 31 of top support member 25 and hole 31a of bottom support member 27. Vertical pivot pin 32 is then inserted through hole 31 of top support member 25, bore 33 of vertical pivot tube 30, and hole 31a of bottom support member 27. Vertical pivot pin 32 has a pin height 70 which is slightly larger than inner clevis height 54 and hole height 64 combined.

Vertical pivot pin 32 is reversibly secured by a pin securing means 66, for example a cotter pin, that is inserted through hole 68 to secure vertical pivot pin 32 in position. Pin securing means 66 secures vertical pivot pin 32 in position and prevents vertical pivot pin 32 from exiting through holes 31, 31a or bore 33.

Vertical pivot point enables operator platform 18 to rotate horizontally with respect to hitch arm 16. The details of the rotation are discussed below with respect to FIG. 4.

During operation of mower 12, vertical pivot point 28 absorbs forces and loads supplied by the torque of mower 12 as mower 12 traverses aberrant terrain and the weight of the operator and operator platform 18 as operator platform 18 also adjusts to the same aberrant terrain. Clevis 24 counterbalances the forces and loads absorbed by vertical pivot point 28. This counterbalance effectively prevents vertical pivot point 28 from uncontrollable bending or experiencing structural failure from the inherent forces and loads applied during operation of sulky 10. By controlling the inherent forces and loads, clevis 24 effectively provides a longer useful sulky life and a sulky that is capable of use by heavier operators of 200 pounds or more.

In FIG. 4, horizontal pivot point 26 of hitch arm 16 is illustrated as attached to hitch 14. Hitch 14 has a hitch bar 74 that extends perpendicular from hitch 14. Hitch bar 74 contains a hitch tube 76 to receive a horizontal pivot pin 78. Horizontal pivot point 26 has parallel members 80 each with member orifices 82 to receive horizontal pivot pin 78. Horizontal pivot pin 78 is secured by hitch bar 74 and a brace 84 on parallel members 80. Horizontal pivot point 26 and hitch bar 74 permit hitch arm 16 to rotate vertically about horizontal pivot pin 78 to permit easier use of sulky 10 on aberrant terrain when being pulled by mower 12. Alternatively, sulky 10 may be designed without horizontal pivot point 26 and instead attached directly to hitch 14.

In the preferred embodiment, upon rotation of hitch arm 16 along rotation A about vertical pivot point 28 (FIG. 3) with respect to operator platform 18, attachment member 29 (FIG. 3) of clevis 24 contacts hitch arm 16 to prevent hitch arm 16 from rotating beyond approximately 190 degrees about operator platform 18. Preferably, hitch arm 16 and operator platform 18 form contact angle 72 with respect to each other when engaged. In the preferred embodiment, contact angle 72 is approximately a 190 degree angle in complete rotation. Although, depending on the design of hitch arm 16, vertical pivot point 28 and operator platform 18 have a contact angle 72 that may be greater or less than 190 degrees. The engagement of operator platform 18 and hitch arm 16 effectively prohibits operator platform 18 from rotating under hitch arm 16 and, thereby, prevents injury to the operator on the operator platform 18.

Thus, there has been provided a sulky that uses a clevis to attach the vertical pivot point of the hitch arm to the operator platform and, thereby, eliminate the uncontrollable anomalies or structural failures in the vertical pivot point that result from the inherent forces and loads applied by the mower and operator during operation of the sulky. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. A sulky for attachment to a self-propelled lawn mower, comprising:

a hitch arm having a proximal end and a distal end, a vertical pivot hollow tube adjacent to the distal end;

a vertical pin;

an operator platform, the operator platform having a first surface, a second surface, a front end, and a back end, the front end further defining a front end height, the first surface and the second surface for supporting a standing operator; a wheel disposed between the first surface and the second and the surface of the operator platform; and a clevis having a top support member, a side support member, and a bottom support member, the top support member and the bottom support member each affixed perpendicularly to the side support member, the side support member further defining a height substantially equal to the front end height of the front end of the operator platform and having a surface facing the front end of the operator platform, the side support member permanently affixed along the surface facing the front end of the operator platform for preventing the clevis from any movement in relation to the operator platform, the top support member and bottom support member each further having a vertical pivot pin insertion point;

whereby the operator platform is rotatably affixed to the hitch arm by sliding the clevis top support member and bottom support member over the vertical pivot hollow tube and inserting the vertical pivot pin through the top support member vertical pivot pin insertion point, the vertical pivot hollow tube, and the bottom support member vertical pivot pin insertion point.

2. The sulky of claim 1 wherein the vertical pivot tube enables the hitch arm to rotate approximately 190 degrees with respect to the operator platform.

3. The sulky of claim 2 wherein the hitch arm and operator platform form a contact angle when rotated with respect to each other.

4. The sulky of claim 1 wherein the top support member and the bottom support member has a shape that is selected from the group consisting of rectangular, trapezoid, and crescent.

5. A sulky for attachment to a self-propelled lawn mower, comprising:
- an operator platform, the operator platform having a first surface and a second surface and further defining a front end and a back end, the front end further comprising a top and a bottom, the first surface and the second surface for supporting a standing operator;
- a wheel disposed between the first surface and the second surface of the operator platform;
- a clevis having a top support member and a bottom support member, the top support member and the bottom support member each secured to the operator platform for eliminating any independent movement of the clevis relative to the operator platform, the top support member extending perpendicularly from the top of the front end of the operator platform and the bottom support member extending perpendicularly from the bottom of the front end of the operator platform, the top support member and the bottom support member being essentially parallel to each other and separated by a predetermined space;
- a hitch arm having a proximal end and a distal end, the hitch arm being adapted to affix to the clevis at its distal end; and
- means for joining the hitch arm to the clevis.

6. The sulky of claim 5 wherein the top support member and the bottom support member of the clevis each further define a hole that extends through both the top support member and the bottom support member.

7. The sulky of claim 6 wherein the top support member and the bottom support member has a shape that is selected from the group consisting of rectangular, trapezoid, and crescent.

8. The sulky of claim 5 wherein the means for joining the hitch arm to the clevis is a vertical pivot pin.

9. The sulky of claim 5 wherein the hitch arm is adapted to rotatably affix to the clevis by means of a vertical pivot tube, the vertical pivot tube being a hollow cylindrical member.

10. The sulky of claim 9 wherein the vertical pivot tube is connected to the hitch arm along its vertical length such that it can be inserted into the spacing between the top support member and the bottom support member until it is aligned with the holes in the top support member and the bottom support member.

11. The sulky of claim 10 wherein the vertical pivot pin is inserted through the hole in the bottom support member, the vertical pivot tube, and the hole in the top support member.

12. The sulky of claim 11 wherein the vertical pivot pin further defines a hole located at each end of the vertical pivot pin, the vertical pivot pin secured within the vertical pivot tube and clevis by a hinge pin being inserted through each hole of the vertical pivot pin.

13. A sulky for attachment to a self-propelled lawn mower, comprising:
- an operator platform for supporting a standing operator, the operator platform having a first surface, a second surface, a front end, and a back end, the first surface and the second surface for supporting a standing operator;
- a wheel disposed between the first surface and the second surface of the operator platform;
- a support member perpendicularly attached to the front end of the operator platform and extending outwardly from the front end of the operator platform, the support member being a single member having a height which is smaller than the height of the front end of the operator platform, the support member having a hole adjacent to the opposite end of the operator platform;
- a single hitch arm having a proximal end and a distal end, the hitch arm adapted to be rotatably affixed to the lawn mower at the proximal end, the hitch arm having a vertical pivot tube adjacent to the distal end, the vertical pivot tube having a bore extending through the center of the vertical pivot tube and a slot perpendicular to the bore; and
- an attachment means, whereby, the operator platform is rotatably connected to the distal end of the hitch arm by sliding the support member into the slot and inserting the attachment means through the bore and the hole in the vertical pivot tube.

14. The sulky of claim 13 wherein the attachment means is a vertical hinge pin.

* * * * *